United States Patent
Kohno et al.

[11] Patent Number: 5,853,919
[45] Date of Patent: Dec. 29, 1998

[54] HYDROGEN-ABSORBING ALLOY, ELECTRODE AND ALKALINE SECONDARY BATTERY

[75] Inventors: Tatsuoki Kohno, Kawasaki; Motoya Kanda; Shinji Tsuruta, both of Yokohama, all of Japan

[73] Assignee: Kabushiki Kaisha Toshiba, Kawasaki, Japan

[21] Appl. No.: 877,200

[22] Filed: Jun. 17, 1997

[30] Foreign Application Priority Data

Jun. 19, 1996 [JP] Japan ..................... 8-158376

[51] Int. Cl.$^6$ .............................. H01M 4/38; H01M 4/46
[52] U.S. Cl. ............................ 429/223; 429/59; 420/900
[58] Field of Search ........................... 429/59, 101, 218, 429/223; 420/900

[56] References Cited

U.S. PATENT DOCUMENTS

5,506,069  4/1996  Ovshinsky et al. .
5,554,456  9/1996  Ovshinsky et al. .
5,616,432  4/1997  Ovshinsky et al. ................ 429/59

Primary Examiner—Stephen Kalafut
Assistant Examiner—Carol Chaney
Attorney, Agent, or Firm—Oblon, Spivak, McClelland, Maier & Neustadt, P.C.

[57] ABSTRACT

A hydrogen-absorbing alloy which comprises a first region comprising 50 to 75 mole % of Mg and not more than 50 mole % of Ni, and at least two regions selected from the group consisting of a second region comprising less than 50 mole % (including 0 mole %) of Mg and less than 75 mole % of Ni, a third region comprising not less than 75 mole % of Mg, and a fourth region comprising not less than 75 mole % of Ni.

29 Claims, 2 Drawing Sheets

HYDROGEN-ABSORBING ALLOY, ELECTRODE AND ALKALINE SECONDARY BATTERY

BACKGROUND OF THE INVENTION

This invention relates to a hydrogen-absorbing alloy, to a electrode and to an alkaline secondary battery.

Hydrogen-absorbing alloy is known as being capable of stably absorbing and storing hydrogen several ten thousands times (calculated as a gas under the normal temperature and pressure) as much as of its own volume. Therefore, hydrogen-absorbing alloy is noticed as a promising material for safely and easily storing, keeping and transporting hydrogen as an energy source. Hydrogen-absorbing alloy is also proposed as a new functional material for use in various applications, such as the storage and transport of hydrogen, the storage and transport of heat, the conversion of heat energy to mechanical energy, the separation and purification of hydrogen, the separation of hydrogen isotope, a battery employing hydrogen as an active material, a catalyst in synthetic chemistry, and a temperature sensor.

Recently, a nickel-hydrogen secondary battery where a hydrogen-absorbing alloy is employed as a negative electrode material has been attracting many attentions as a public-use battery of next generation, because the battery is advantageous in various aspects, e.g. it is high in capacity, highly resistive to over charging and over discharging, capable of performing a large current charge/discharge, free from environmental pollution, and interchangeable with a nickel-cadmium battery. Accordingly, many attempts have been intensively made at present for the application and actual use of the nickel-hydrogen battery.

As evident from these facts, the hydrogen-absorbing alloy has many possibilities for various applications in view of its physical and chemical characteristics, so that the hydrogen-absorbing alloy is now considered as being one of important raw materials in future industries.

The metal capable of absorbing hydrogen may be in the form of substance which reacts exothermically with hydrogen, i.e., a metal element capable of forming a stable compound together with hydrogen (for example, Pd, Ti, Zr, V, rare earth elements and alkaline earth elements); or in the form of an alloy comprising an above-mentioned metal alloyed with another kind of metals.

One of the advantages of the alloying is that the bonding strength between a metal and hydrogen can be suitably weakened so that not only the absorption reaction but also the desorption (releasing) reaction can be performed comparatively easily. Second advantage of the alloying is that the absorption and desorption characteristics of the alloy with respect to the magnitude of hydrogen gas pressure required for the absorption/desorption reaction (equilibrium pressure; plateau pressure), the extent of equilibrium region (plateau region), the change of equilibrium pressure during the process of absorbing hydrogen (flatness) and the like can be improved. Third advantage of the alloying is the improvement in chemical and physical stability of the alloy.

The composition of the conventional hydrogen-absorbing alloy may be classified into the following types;

(1) an $AB_5$ type (for example, $LaNi_5$, $CaNi_5$);

(2) an $AB_2$ type (for example, $MgZn_2$, $ZrNi_2$);

(3) an AB type (for example, TiNi, TiFe);

(4) an $A_2B$ type (for example, $Mg_2Ni$, $Ca_2Fe$); and (5) other types (for example, cluster);

wherein A represents a metal element which is capable of exothermically reacting with hydrogen, and B, another kind of metal.

Among them, $LaNi_5$ of (1), a Laves phase alloy belonging to (2) and some kinds of alloy belonging to (3) are capable of reacting with hydrogen at the normal temperature, and chemically stable so that they are extensively studied as a candidate for the electrode material of the secondary battery.

Whereas, the hydrogen-absorbing alloy belonging to (4) $Mg_2Ni$ type is accompanied with the following problems. Namely, the alloy is highly compatible with hydrogen so that hydrogen once absorbed therein can be hardly released. The absorption and desorption reaction thereof occurs only when the temperature thereof is raised up to a relatively high degree about 200° to 300° C.), and the rate of the reaction, if occurred, is very slow. The chemical stability, in particular the stability in an aqueous solution of the alloy is comparatively low. In view of these facts, the hydrogen-absorbing alloy of $Mg_2Ni$ type is rarely utilized except for the storage and transport of hydrogen in spite of its hydrogen absorbing capacity per unit volume which is comparable to other types of hydrogen-absorbing alloy and its hydrogen absorbing capacity per unit weight which is two to several times as high as that of other types of hydrogen-absorbing alloy. Therefore, if these problems inherent to the hydrogen-absorbing alloy of $Mg_2Ni$ type as explained above are solved, it would be possible to expand the application of the hydrogen-absorbing alloy not only to the same physico-chemical fields as those of other types of hydrogen-absorbing alloy but also to a new field.

As for the alloy of the type (5), there have been reported a number of academic papers on this type. However, almost none of them have succeeded to put it into practical use or a testing stage for practical use up to date.

As explained above, the $Mg_2Ni$ type hydrogen-absorbing alloy has advantages over other types of hydrogen-absorbing alloy in that it is light in weight, large in capacity and low in raw material cost since its composition is consisted mainly of alkaline earth metals and iron group elements. However, this $Mg_2Ni$ type hydrogen-absorbing alloy is accompanied with various problems as explained above.

BRIEF SUMMARY OF THE INVENTION

Accordingly, an object of the present invention is to provide a hydrogen-absorbing alloy which is improved in hydrogen-absorbing property, in particular hydrogen-absorbing rate at the normal temperature or so, thereby solving one of the problems accompanied with the $Mg_2Ni$ type hydrogen-absorbing alloy.

A further object of this invention is to provide a electrode, which comprises a hydrogen-absorbing alloy improved in hydrogen-absorbing rate.

A still further object of this invention is to provide an alkaline secondary battery which is improved in charge/discharge cycle property.

Namely, according to the present invention, there is provided a hydrogen-absorbing alloy which comprises:

a first region comprising 50 to 75 mole % of Mg, and not more than 50 mole % of Ni; and at least two regions selected from the group consisting of a second region comprising less than 50 mole % (including 0 mole %) of Mg and less than 75 mole % of Ni, a third region comprising not less than 75 mole % of Mg, and a fourth region comprising not less than 75 mole % of Ni.

According to the present invention, there is further provided a electrode, which comprises a hydrogen-absorbing alloy which comprises:

a first region comprising 50 to 75 mole % of Mg, and not more than 50 mole % of Ni; and at least two regions selected from the group consisting of a second region comprising less than 50 mole % (including 0 mole %) of Mg and less than 75 mole % of Ni, a third region comprising not less than 75 mole % of Mg, and a fourth region comprising not less than 75 mole % of Ni.

Further, according to the present invention, there is also provided an alkaline secondary battery having a negative electrode comprising a hydrogen-absorbing alloy which comprises:

a first region comprising 50 to 75 mole % of Mg, and not more than 50 mole % of Ni; and at least two regions selected from the group consisting of a second region comprising less than 50 mole % (including 0 mole %) of Mg and less than 75 mole % of Ni, a third region comprising not less than 75 mole % of Mg, and a fourth region comprising not less than 75 mole % of Ni.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

This invention will be further explained in detail as follows.

The hydrogen-absorbing alloy according to this invention is featured in that it comprises:

a first region comprising 50 to 75 mole % of Mg and not more than 50 mole % of Ni; and at least two regions (hereinafter referred to as the II region) selected from the group consisting of a second region comprising less than 50 mole % (including 0 mole %) of Mg and less than 75 mole % of Ni, a third region comprising not less than 75 mole % of Mg and a fourth region comprising not less than 75 mole % of Ni.

By the term of "region" as recited in this specification, it is intended to include a crystal grain region composed of homogeneous crystal grains; a crystal grain region where microscopic grains are uniformly dispersed; an intergranular region existing between crystal grains; a region composed of aggregated microcrystals; and an amorphous region; which are distinct in terms of composition and structure from each other.

The alloy may have a constitution as follows. In the constitution, the first region contains the other regions (the II region), and the boundary between the first region and each of the other regions is clear or unclear. The boundary is clear when the other regions exit as phases in the first region. The boundary is unclear when each of the other regions has a composition which changes to a desired one, gradually from the outer surface to the core. In this alloy, any two or three of the second to fourth regions may contact each other.

Followings are explanations on each of these regions (a first region to a fourth region).

(1) A first region

The first region (M1) generally functions as a matrix for absorbing/desorbing hydrogen. In other words, the first region generally functions as a host matrix of hydrogen absorption. If the content of Mg or Ni in this region falls out of the aforementioned range, the hydrogen absorption volume of the alloy would be decreased, thus reducing the hydrogen absorption property of the alloy. In view of improving the hydrogen absorption volume of the alloy, the lower limit in content of Ni in this first region should preferably be 25 mole %. One example of this first region is a region which is composed mainly of $Mg_2Ni$ and contains less than 15 mole % of impurities. The alloy comprising the first region having such a composition is capable of further increasing the hydrogen absorption volume. The impurities that may be contained in this first region may be Cr, Mo, Mn, Tc, Re, Fe, Ru, Os, Co, Cu, Al, Ag, B, C and Si, which may enter into the alloy during the manufacture or heat treatment of the alloy since the ratio of Mg component in the alloy is relatively large. The impurities contained in the alloy may be oxides of these elements. The first region should preferably comprise 60 to 70 mole % of Mg and 20 to 40 mole % of Ni. When the contents of Mg and Ni are confined within these ranges, the aforementioned region composed mainly of $Mg_2Ni$ can be easily obtained.

(2) A second region

It is assumed that the second region (M2) functions to instabilize the hydrogen once absorbed in the alloy and hence to promote a hydrogen desorption reaction. If the content of Mg or Ni in this region falls out of the aforementioned range, the hydrogen absorbed in the alloy would be stabilized, thus reducing the hydrogen desorption property of the alloy. One example of this second region is a region which is composed mainly of $MgNi_2$ and contains less than 15 mole % of impurities. The alloy comprising the second region having such a composition is capable of further increasing the hydrogen desorption property. The impurities that may be contained in this second region may be Rh, Ir, Pd, Pt, Au, Cd, Sn, Y, La, Ce, Pr, Sm, Co and Fe, which may enter into the alloy during the manufacture or heat treatment of the alloy since the ratio of Ni component in the alloy is relatively large. The impurities contained in the alloy may be oxides of these elements. The second region should preferably be comprise 20 to 40 mole % of Mg and 60 to 70 mole % of Ni. When the contents of Mg and Ni are confined within these ranges, the aforementioned region composed mainly of $MgNi_2$ can be easily obtained.

(3) A third region

It is assumed that the third region (M3) functions to increase the hydrogen absorption volume of the alloy. If the content of Mg in this region falls out of the aforementioned range, the hydrogen absorption volume of the alloy would be decreased. One example of this third region is a region which is composed mainly of Mg and contains less than 25 mole % of impurities. The impurities that may be contained in this third region may be Li, Na, K, Ca, Sr, Ba, Rb, Sc, In, Tl, Pb, Sb, Bi, Te, Ni, Co, Fe, Zr and Hf, which may enter into the alloy during the manufacture or heat treatment of the alloy. The content of Mg should preferably be in the range of 80 mole % to 95 mole % in view of further enhancing the hydrogen absorption volume.

(4) A fourth region

It is assumed that the fourth region (M4) functions as a dissociation catalyst of hydrogen at the occasion of hydrogen absorption. If the content of Ni in this region falls out of the aforementioned range, the hydrogen absorption rate of the alloy would be decreased. One example of this fourth region is a region which is composed mainly of Ni and contains less than 25 mole % of impurities. The impurities that may be contained in this fourth region may be Ti, V, Nb, Ta, Mg, Ga, Zn, Ge, N, O, P, S, As, Se and F, which may enter into the alloy during the manufacture or heat treatment of the alloy. The content of Ni should preferably be in the range of 80 mole % to 95 mole % in view of further enhancing the hydrogen absorption rate.

The content of the II region coexisting with the first region should preferably be 0.001 to 50 mole %. If the coexisting content of the II region is less than 0.001 mole %, it may become difficult to sufficiently enhance the hydrogen absorption rate of the hydrogen-absorbing alloy at the normal temperature or so. On the other hand, if the coexisting content of the II region exceeds over 50 mole %, hydrogen absorption volume of the hydrogen-absorbing alloy may be decreased. Therefore, a more preferably range of the coexisting content of the II region may be 1 to 30 mole %.

One of the components of the II region should preferably be the second region (M2). The ratio of this second region (M2) in the total quantity of the II region should preferably be 0.1 to 90 mole %.

Preferably, the II region should preferably be composed of the second region (M2) and the third region (M3). Because, the alloy containing such a II region is capable of prominently improving the hydrogen absorption rate at the normal temperature or so while assuring a high hydrogen absorption volume. The content of each of the second and third regions in the alloy should preferably be in the range of 1 to 10 mole %.

The hydrogen-absorbing alloy containing the first region (M1) and the II region (two or more kinds of regions selected from M2 to M4) can be manufactured by a high frequency dissolving method, a liquid quenching method, an atomizing method, a sintering method, a plating method, a CVD method, a sputtering method, a rolling method, or a sol-gel processing. Further, the composition of each region can be analyzed by means of an electron probe X-ray micro-region analyzing method (EPMA), an energy diffusion type X-ray spectroscopic method (EDX), or an Auger electron spectroscopic method (AES).

Since the hydrogen-absorbing alloy according to this invention comprises: a first region comprising 50 to 75 mole % of Mg and not more than 50 mole % of Ni; and at least two regions (i.e. the II region) selected from the group consisting of a second region comprising less than 50 mole % (including 0 mole %) of Mg and less than 75 mole % of Ni, a third region comprising not less than 75 mole % of Mg and a fourth region comprising not less than 75 mole % of Ni, the hydrogen absorption property in particular the hydrogen absorption rate thereof can be improved as compared with the conventional $Mg_2Ni$ alloy.

Namely, if a hydrogen-absorbing alloy is formed with a region comprising 50 mole % or more of Mg and 25 mole % or more of Ni, not only the alloy is required to be heated up to a relatively high temperature (about 300° C.) at the occasion of hydrogen absorption, but also the hydrogen absorption rate becomes too small, so that it is impossible to absorb hydrogen at the normal temperature or so. It is possible, only when the hydrogen-absorbing alloy comprises not less than three regions, i.e. the aforementioned first region in coexistence with at least two kinds of regions selected from the aforementioned second, third and fourth regions, to promote the dissociation reaction of hydrogen adsorbed on the surface of the hydrogen-absorbing alloy and hence to prominently increase the hydrogen absorption property, in particular hydrogen absorption rate.

The hydrogen-absorbing alloy according to this invention is larger in hydrogen absorption volume per unit weight, lower in manufacturing cost and lighter in weight as compared with the conventional rare earth-based hydrogen-absorbing alloy.

Figure 1:
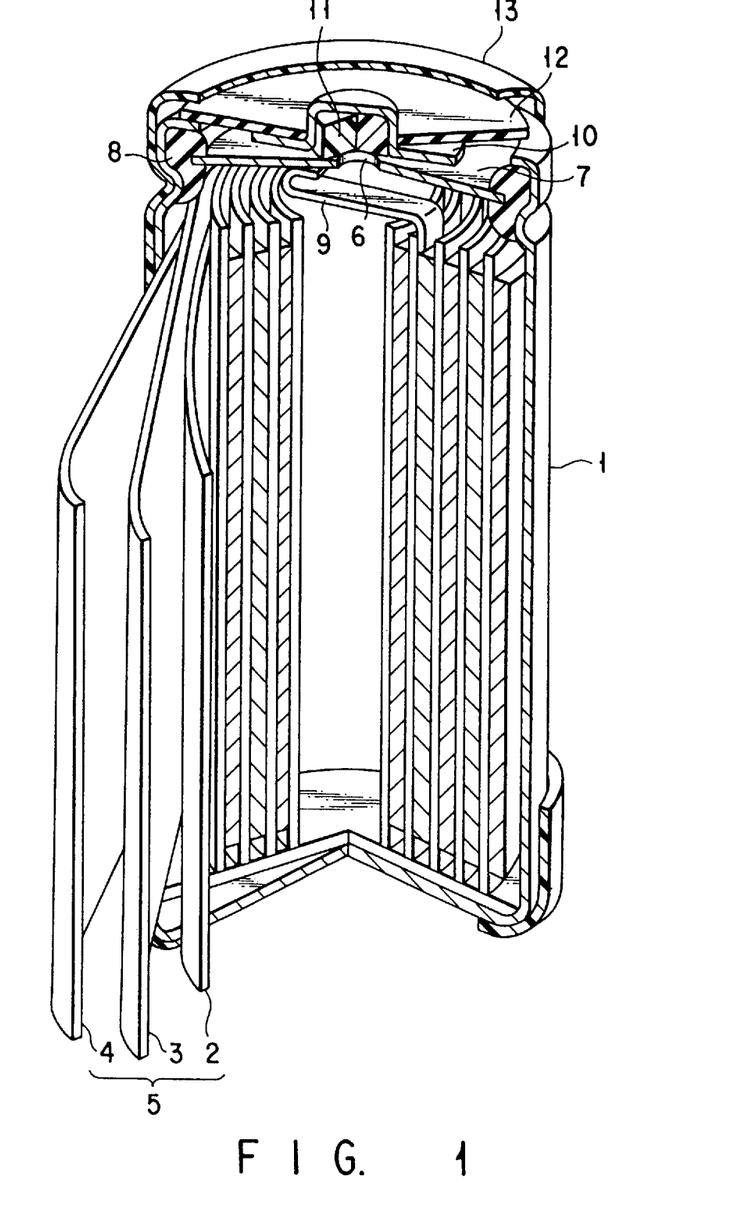
FIG. 1 is a partially sectioned perspective view showing a cylindrical nickel-hydrogen secondary battery representing one embodiment of an alkaline secondary battery of this invention.

This invention will be explained further with reference to FIG. 1 showing a cylindrical nickel-hydrogen secondary battery embodying an alkaline secondary battery of this invention.

Referring to FIG. 1, a bottomed cylindrical case 1 is accommodated therein with an electrode group 5 which has been manufactured by stacking a positive electrode 2, a separator 3 and a negative electrode 4, and then by spirally winding the stacked body. The negative electrode 4 is disposed at the outermost periphery of the electrode group 5 so as to electrically contact with the cylindrical case 1. The cylindrical case 1 contains an alkaline electrolyte. A first sealing plate 7 formed of a disk having an opening 6 at the center is disposed on the upper opening of the cylindrical case 1. An insulating gasket 8 having a ring-like shape is interposed between the periphery of the first sealing plate 7 and the inner wall of the opening of the cylindrical case 1. The peripheral fringe portion of the opening of the cylindrical case 1 is caulked inward so that the first sealing plate 7 is hermetically fixed via the gasket 8 to cylindrical case 1. The positive electrode lead 9 is connected through its one end to the positive electrode 2 and through its other end to the lower surface of the first sealing plate 7. A positive electrode terminal 10 having a hat-like shape is mounted over the first sealing plate 7 in such a manner as to cover the opening 6. A rubber safety valve 11 is disposed in a space surrounded by the first sealing plate 7 and the positive electrode terminal 10 in such a manner as to seal the opening 6. A holding plate 12 formed of an insulating disk having an opening at the center is disposed over the positive electrode terminal 10 in such a manner that the projected portion of the positive electrode terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The positive electrode 2

This positive electrode 2 can be manufactured by adding a conductive material to an active material, i.e. nickel hydroxide powder, and the resultant mixture is kneaded together with a polymeric binder and water to prepare a paste, which is then stuffed into an electro-conductive substrate and, after being dried, molded into a predetermined shape.

As for the conductive material, cobalt oxide, cobalt hydroxide, metallic cobalt, metallic nickel and carbon can be used.

Examples of polymeric binder are carboxymethyl cellulose, methyl cellulose, sodium polyacrylate and polytetrafluoroethylene.

The electroconductive substrate may be formed from a mesh-like, sponge-like, fibrous or felt-like metallic porous body which is made of nickel, stainless steel or nickel-plated metal.

(2) The negative electrode 4

This negative electrode 4 can be manufactured by adding a conductive material to a hydrogen-absorbing alloy powder and kneading the resultant mixture together with a polymeric binder and water to prepare a paste, which is then stuffed into an electroconductive substrate and, after being dried, molded into a predetermined shape, thereby forming the negative electrode 4.

As for the hydrogen-absorbing alloy, the aforementioned alloy which comprises a first region comprising 50 to 75 mole % of Mg and not more than 50 mole % of Ni; and at least two regions selected from the group consisting of a second region comprising less than 50 mole % (including 0 mole %) of Mg and less than 75 mole % of Ni, a third region comprising not less than 75 mole % of Mg, and a fourth region comprising not less than 75 mole % of Ni can be employed.

As for the polymeric binder, the same materials as employed for the positive electrode 2 can be used.

As for the conductive material, carbon black for example can be used.

The electroconductive substrate may be formed from a two-dimensional substrate such as a nickel net, a punched metal, a expanded metal or a porous steel plate, a three-dimensional substrate such as a felt-like metallic porous body or a sponge-like metallic body.

Since this negative electrode contains a hydrogen-absorbing alloy exhibiting an improved hydrogen absorption rate, the stability during the charge/discharge cycle can be improved. Furthermore, since the hydrogen-absorbing alloy to be used as this negative electrode is lower in manufacturing cost and lighter in weight as compared with the conventional rare earth-based hydrogen-absorbing alloy, it is possible to produce at low cost an alkaline secondary battery of light weight.

(3) The separator 3

The separator 3 may be formed of a nonwoven polymer fabric such as a polypropylene nonwoven fabric a nylon nonwoven fabric or a nonwoven fabric comprising polypropylene fiber and nylon fiber. In particular, a polypropylene nonwoven fabric treated to have a hydrophilic surface is preferable as a separator.

(4) Alkaline electrolyte

Examples of the alkaline electrolyte which are useful in this invention include an aqueous solution of sodium hydroxide (NaOH), an aqueous solution of lithium hydroxide (LiOH), an aqueous solution of potassium hydroxide (KOH), a mixed solution of sodium hydroxide (NaOH) and lithium hydroxide (LiOH), a mixed solution of potassium hydroxide (KOH) and lithium hydroxide (LiOH), and a mixed solution of NaOH, KOH and LiOH.

Since the alkaline secondary battery explained above comprises a negative electrode comprising a hydrogen-absorbing alloy which is improved in hydrogen absorption rate at the normal temperature or so, and is low in manufacturing cost and light in weight, the alkaline secondary battery would exhibit an excellent charge/discharge cycle performance and would be light in weight.

Although this invention has been explained about a cylindrical alkaline secondary battery, it is also possible according to this invention to apply it to a rectangular alkaline secondary battery, wherein a closed-end rectangular case is accommodated therein with an electrode group consisting of a laminated body comprising positive electrodes and negative electrodes which are alternately superimposed one upon another with a separator being interposed therebetween, and with an alkali electrolyte.

Followings are preferred embodiments of this invention.

Figure 2:
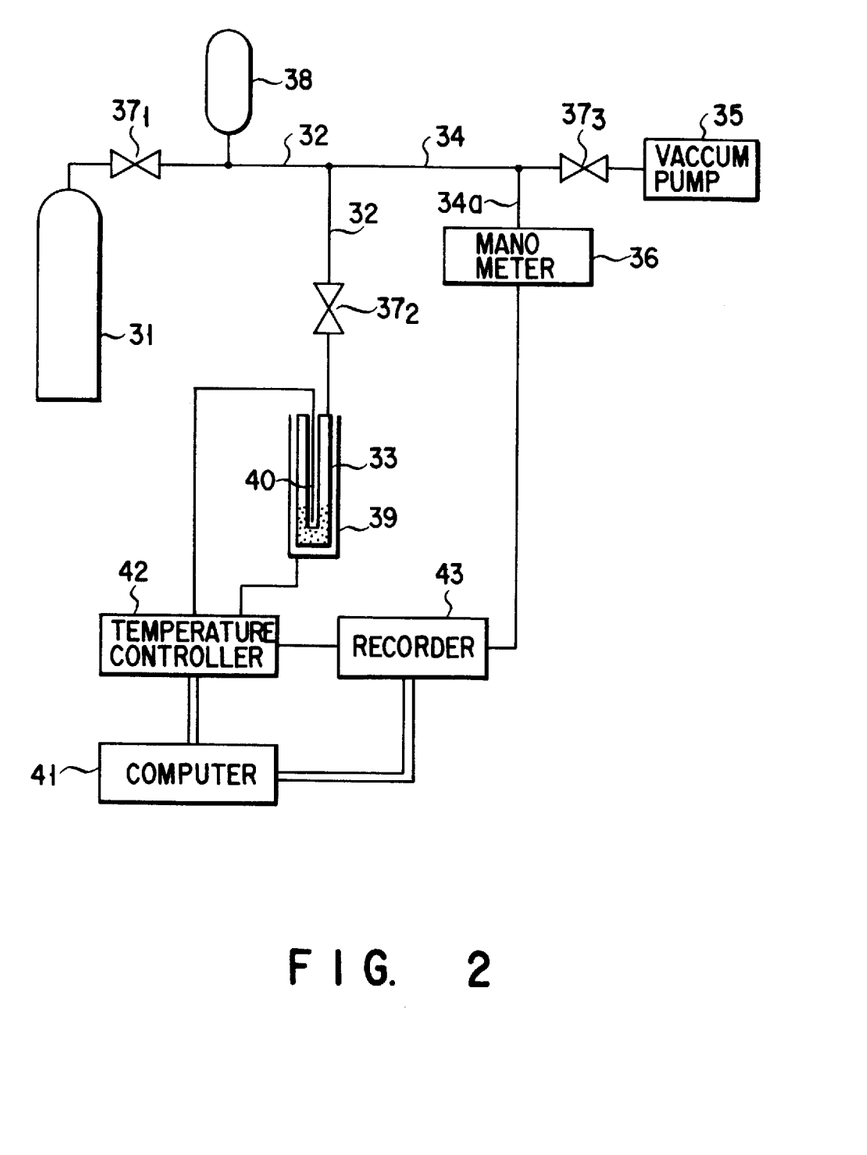
FIG. 2 is a schematic view of a temperature-scanning type hydrogen absorption/desorption property-evaluating apparatus to be employed in the Example of this invention.

FIG. 2 illustrates a temperature scanning type hydrogen absorption/desorption property-evaluating apparatus employed in the evaluation of hydrogen-absorbing alloys obtained in Examples 1 to 20 and in Comparative Examples 1 to 4. Referring to FIG. 2, a hydrogen gas cylinder 31 is connected via a pipe 32 to a test sample vessel 33. The middle portion of the pipe 32 is branched, and a distal end of the branched pipe 34 is connected to a vacuum pump 35. A manometer 36 is mounted on a pipe portion 34a branched from the branched pipe 34. On the pipe 32 interposed between the hydrogen gas cylinder 31 and the test sample vessel 33 are mounted in the order (starting from the hydrogen gas cylinder 31) of a first valve $37_1$ and a second valve $37_2$. On a portion of the pipe 32 disposed between the first valve $37_1$ and a second valve $37_2$ is connected a pressure accumulator 38. Further, the vacuum pump 35 is connected via a third valve $37_3$ to a portion of the branched pipe 34a. The test sample vessel 33 has a heater 39. A thermocouple 40 is disposed inside the test sample vessel 33. A temperature controller 42 to be controlled by a computer 41 is connected to both of the thermocouple 40 and the heater 39 so as to control the temperature of the heater 39 on the basis of a temperature detected from the thermocouple 40. A recorder 43 to be controlled by the computer 41 is connected to both of the manometer 36 and the temperature controller 42. (Examples 1 to 20; and Comparative Examples 1 to 4)

Various kinds of hydrogen-absorbing alloy each having a composition shown in the following Tables 1 to 3 were prepared. In Tables 1 to 3, M1 represents a first region comprising 50 to 75 mole % of Mg and not more than 50 mole % of Ni; M2 represents a second region comprising less than 50 mole % (including 0 mole %) of Mg and less than 75 mole % of Ni; M3 represents a third region comprising not less than 75 mole % of Mg; and M4 represents a fourth region comprising not less than 75 mole % of Ni. The coexising content (mole %) of each region (M2 to M4) is calculated based on the total element quantity (i.e. 100 mole %) of the regions existing in the hydrogen-absorbing alloy. Further, the columns of I1 to I4 shown in the following Tables 1 to 3 represent impurities existing, if any, in each region (M1 to M4). The contents of metals and impurities in each region (M1 to M4) are calculated based on the total quantity (i.e. 100 mole %) of elements in each region. The composition of each region (M1 to M4) was analyzed by means of the EDX.

The alloys of Examples 1 to 20 and the alloys of comparative Examples 1 to 4 comprise the first region (i.e., the main component) and at least two regions existing in the first region and selected from the group consisting of the second to fourth regions. The boundaries between the first region and each of the other regions is unclear. Namely, the second to fourth regions has a composition which changes to a desired one, gradually from the outer surface to the core.

Then, each of these hydrogen-absorbing alloys was charged into the test sample vessel 33 (ambient temperature: 25° C.) shown in FIG. 2. Thereafter, the first vale $37_1$ was closed, and both of the second valve $37_2$ and the third valve $37_3$ were opened. Under this condition, the vacuum pump 35 was actuated to exhaust the air in each of the pipe 32, the branched pipe 34, the pressure accumulator 38 and the test sample vessel 33. Then, after closing the second valve $37_2$ and the third valve $37_3$, the first valve $37_1$ was opened to supply hydrogen from the hydrogen gas cylinder 31 to each of the pipe 32, the branched pipe 34 and the pressure accumulator 38 thereby carrying out a hydrogen displacement of them. Subsequently, the first valve $37_1$ was closed and at the same time, the quantity of hydrogen introduced was calculated from the pressures of the system indicated by the manometer 36. Thereafter, the second valve $37_2$ was opened thereby feeding hydrogen to the test sample vessel 33, and the temperature thereof was monitored with the thermo-couple 40. Thereafter, the temperature in the test sample vessel 33 was raised by the heater 39 which is controlled by control signals supplied from the computer 41 and the temperature controller 42. The computer 41 and the controller 42 had set the control signals at such levels as to raise the temperature in the vessel 33 at a constant rate. At this moment, a change in pressure if any within the test sample vessel 33 was detected by means of the manometer 36 and recorded in the recorder 43.

The quantity of hydrogen (wt %) that was absorbed in each of the hydrogen-absorbing alloys during a time period of one hour after the introduction of a fixed amount of hydrogen gas into the test sample vessel 33 was measured by detecting the pressure change inside the test sample vessel 33, the results being shown in the following Tables 1 to 3.

TABLE 1

| | Components of hydrogen absorbing alloy (mole %) | | | | | | | | | | | | | |
|---|---|---|---|---|---|---|---|---|---|---|---|---|---|---|
| | M1 | | | M2 | | | Co-existing quantity of M2 | M3 | | Co-existing quantity of M3 | M4 | | Co-existing quantity of M4 | Hydrogen absorption volume (wt %) |
| | Mg | Ni | I1 | Mg | Ni | I2 | | Mg | I3 | | Ni | I4 | | |
| Comparative Example 1 | 67 | 33 | — | — | — | — | — | — | — | — | — | — | — | 0 |
| Comparative Example 2 | 67 | 33 | — | 33 | 67 | — | 10 | — | — | — | — | — | — | 0.1 |
| Comparative Example 3 | 67 | 33 | — | — | — | — | — | 100 | — | 5 | — | — | — | 0.2 |
| Comparative Example 4 | 67 | 33 | — | — | — | — | — | — | — | — | 100 | — | 3 | 0.1 |
| Example 1 | 67 | 33 | — | 33 | 67 | — | 10 | 100 | — | 5 | — | — | — | 2.5 |
| Example 2 | 67 | 33 | — | 33 | 67 | — | 10 | — | — | — | 100 | — | 3 | 2.0 |
| Example 3 | 67 | 33 | — | — | — | — | — | 100 | — | 5 | 100 | — | 3 | 1.9 |
| Example 4 | 67 | 33 | — | 33 | 67 | — | 10 | 100 | — | 5 | 100 | — | 3 | 2.8 |

TABLE 2

| | Components of hydrogen absorbing alloy (mole %) | | | | | | | | | | | | | |
|---|---|---|---|---|---|---|---|---|---|---|---|---|---|---|
| | M1 | | | M2 | | | Co-existing quantity of M2 | M3 | | Co-existing quantity of M3 | M4 | | Co-existing quantity of M4 | Hydrogen absorption volume (wt %) |
| | Mg | Ni | I1 | Mg | Ni | I2 | | Mg | I3 | | Ni | I4 | | |
| Example 5 | 70 | 25 | Fe 5 | 20 | 70 | Sm 10 | 5 | 92 | Pb 8 | 1 | — | — | — | 2.6 |
| Example 6 | 68 | 30 | Co 2 | 30 | 65 | Y 5 | 23 | — | — | — | 90 | Ti 10 | 0.1 | 2.3 |
| Example 7 | 58 | 40 | Cu 2 | — | — | — | — | 93 | Ca 7 | 12 | 89 | N 11 | 1 | 2.9 |
| Example 8 | 69 | 31 | — | 32 | 66 | Cd 2 | 11 | 99 | Hf 1 | 3 | 96 | N 4 | 0.5 | 3.2 |
| Example 9 | 71 | 25 | Al 4 | 21 | 69 | Sn 10 | 8 | 95 | Sr 5 | 2 | — | — | — | 2.6 |
| Example 10 | 66 | 30 | Ag 4 | 31 | 65 | Rh 4 | 15 | — | — | — | 93 | Nb 7 | 5 | 2.7 |
| Example 11 | 55 | 41 | Mn 4 | — | — | — | — | 82 | Zr 18 | 21 | 92 | O 8 | 10 | 2.4 |
| Example 12 | 65 | 35 | — | 25 | 70 | Pd 5 | 2 | 94 | Li 6 | 0.5 | 96 | Ta 4 | 0.2 | 3.1 |

TABLE 3

| | Components of hydrogen absorbing alloy (mole %) | | | | | | | | | | | | | |
|---|---|---|---|---|---|---|---|---|---|---|---|---|---|---|
| | M1 | | | M2 | | | Co-existing quantity of M2 | M3 | | Co-existing quantity of M3 | M4 | | Co-existing quantity of M4 | Hydrogen absorption volume (wt %) |
| | Mg | Ni | I1 | Mg | Ni | I2 | | Mg | I3 | | Ni | I4 | | |
| Example 13 | 63 | 36 | Mo 1 | 40 | 55 | Sn 5 | 1 | 98 | Fe 2 | 0.3 | — | — | — | 3.0 |
| Example 14 | 70 | 21 | B 9 | 33 | 64 | Pr 3 | 9 | — | — | — | 88 | Ga 12 | 3 | 2.9 |
| Example 15 | 68 | 30 | Si 2 | — | — | — | — | 93 | Na 7 | 15 | 94 | O 6 | 4 | 2.7 |
| Example 16 | 58 | 41 | Ru 1 | 28 | 71 | Ce 1 | 17 | 95 | Ba 5 | 2 | 87 | V 13 | 1 | 3.1 |
| Example 17 | 55 | 45 | — | 16 | 72 | Pt 12 | 13 | 88 | In 12 | 3 | — | — | — | 3.4 |
| Example 18 | 60 | 28 | Cr 12 | 45 | 51 | Ir 4 | 3 | — | — | — | 95 | Zn 5 | 0.4 | 2.8 |
| Example 19 | 71 | 20 | C 9 | — | — | — | — | 87 | K 13 | 21 | 98 | O 2 | 3 | 2.6 |
| Example 20 | 73 | 19 | W 8 | 30 | 69 | Pd 1 | 42 | 89 | Bi 11 | 0.5 | 91 | N 9 | 0.2 | 3.2 |

As apparent from Tables 1 to 3, in the case of the hydrogen-absorbing alloy composed of $Mg_2Ni$ alloy as seen in Comparative Example 1, a temperature of as high as about 300° C. was required for a reaction with hydrogen, and moreover this reaction rate was very slow so that the reaction with hydrogen did not proceed at all at the normal temperature, i.e. the hydrogen absorption volume was almost zero. On the other hand, in the case of the hydrogen-absorbing alloy composed of two phases as seen in Comparative Example 2 to 4, the hydrogen-absorption property could hardly be improved.

Whereas, in the case of the hydrogen-absorbing alloy which was constituted by not less than three regions, i.e. the aforementioned first region (M1) and at least two kinds of regions selected from the aforementioned second, third and fourth regions (M2 to M4) as seen in Examples 1 to 20, it was possible to prominently increase the hydrogen absorption rate, thus indicating an excellent hydrogen absorption property. (Examples 21 to 40; and Comparative Examples 5 to 8)

The powder of hydrogen-absorbing alloy having a composition shown in Tables 4 to 6 and electrolytic copper powder were mixed together at a ratio of 1:1 by weight. Then, 1 g of this mixture was press-molded for 5 minutes under a pressure of 10,000 kg by making use of a tablet molding machine (inner diameter: 10 mm) to produce a pellet. The resultant pellet was sandwiched between a pair of nickel meshes to form a composite, the periphery of which was then spot-welded. Thereafter, a nickel lead wire was further spot-welded thereby attaching it to the composite to produce 24 kinds of an alloy electrode (a negative electrode). In Tables 4 to 6, M1 represents a first region comprising 50 to 75 mole % of Mg and not more than 50 mole % of Ni; M2 represents a second region comprising less than 50 mole % (including 0 mole %) of Mg and less than 75 mole % of Ni; M3 represents a third region comprising not less than 75 mole % of Mg; and M4 represents a fourth region comprising not less than 75 mole % of Ni. The coexisting content (mole %) of each region (M2 to M4) was calculated based on the total quantity (i.e. 100 mole %) of the regions existing in the hydrogen-absorbing alloy. Further, the columns of I1 to I4 shown in the following Tables 4 to 6 represent impurities existing, if any, in each region (M1 to M4). The contents of metals and impurities in each region (M1 to M4) were calculated based on the total quantity (i.e. 100 mole %) of elements in each region.

The alloys of Examples 21 to 40 and the alloys of comparative Examples 5 to 8 comprise the first region (I,e., the main component) and at least two regions existing in the first region and selected from the group consisting of the second to fourth regions. The boundaries between the first region and each of the other regions is unclear. Namely, the second to fourth regions has a composition which changes to a desired one, gradually from the outer surface to the core.

Each of the negative electrodes was immersed together with a sintered nickel electrode constituting a counter electrode (positive electrode) in a 8N aqueous solution of potassium hydroxide (alkaline electrolyte), and a charge/discharge cycle test was performed at a temperature of 25° C. (so as to measure a maximum discharge capacity. The charge/discharge conditions in this test were as follows. Namely, the secondary battery was subjected at first to a charging for 10 hours with a current of 100 mA per 1 g of the hydrogen-absorbing alloy, and, after 10 minute cessation, discharged with a current of 20 mA per 1 g of the hydrogen-absorbing alloy until the battery voltage (with respect to a mercury oxide electrode) was decreased down to −0.5V. This charge/discharge cycle was repeated. The results of this test are shown in the following Tables 4 to 6.

TABLE 4

| | Components of hydrogen absorbing alloy (mole %) | | | | | | | | | | | | |
|---|---|---|---|---|---|---|---|---|---|---|---|---|---|
| | M1 | | | M2 | | | Co-existing quantity of M2 | M3 | | Co-existing quantity of M3 | M4 | | Co-existing quantity of M4 | Maximum discharge capacity (mAh/g) |
| | Mg | Ni | I1 | Mg | Ni | I2 | | Mg | I3 | | Ni | I4 | | |
| Comparative Example 5 | 67 | 33 | — | — | — | — | — | — | — | — | — | — | — | 0 |
| Comparative Example 6 | 67 | 33 | — | 33 | 67 | — | 8 | — | — | — | — | — | — | 5 |
| Comparative Example 7 | 67 | 33 | — | — | — | — | — | 100 | — | 3 | — | — | — | 10 |
| Comparative Example 8 | 67 | 33 | — | — | — | — | — | — | — | — | 100 | — | 1 | 5 |
| Example 21 | 67 | 33 | — | 33 | 67 | — | 8 | 100 | — | 3 | — | — | — | 150 |
| Example 22 | 67 | 33 | — | 33 | 67 | — | 8 | — | — | — | 100 | — | 1 | 180 |
| Example 23 | 67 | 33 | — | — | — | — | — | 100 | — | 3 | 100 | — | 1 | 125 |
| Example 24 | 67 | 33 | — | 33 | 67 | — | 8 | 100 | — | 3 | 100 | — | 1 | 210 |

TABLE 5

| | Components of hydrogen absorbing alloy (mole %) | | | | | | | | | | | | |
|---|---|---|---|---|---|---|---|---|---|---|---|---|---|
| | M1 | | | M2 | | | Co-existing quantity of M2 | M3 | | Co-existing quantity of M3 | M4 | | Co-existing quantity of M4 | Maximum discharge capacity (mAh/g) |
| | Mg | Ni | I1 | Mg | Ni | I2 | | Mg | I3 | | Ni | I4 | | |
| Example 25 | 65 | 30 | Cu 5 | 15 | 70 | La 15 | 12 | 95 | In 5 | 2 | — | — | — | 185 |
| Example 26 | 66 | 28 | C 6 | 35 | 65 | — | 21 | — | — | — | 85 | O 15 | 8 | 235 |
| Example 27 | 62 | 36 | Mn 2 | — | — | — | — | 82 | Co 18 | 17 | 88 | N 12 | 3 | 210 |
| Example 28 | 70 | 25 | Al 5 | 25 | 70 | Sn 5 | 3 | 90 | Fe 10 | 0.5 | 95 | Ti 5 | 1 | 220 |
| Example 29 | 67 | 32 | Ag 1 | 33 | 67 | — | 18 | 96 | zr 4 | 2 | — | — | — | 260 |
| Example 30 | 60 | 35 | Si 5 | 31 | 68 | Ir 1 | 9 | — | — | — | 100 | — | 2 | 195 |
| Example 31 | 66 | 34 | — | — | — | — | — | 91 | Te 9 | 15 | 97 | V 3 | 3 | 275 |
| Example 32 | 62 | 35 | C 3 | 32 | 60 | Cd 8 | 5 | 100 | — | 1 | 89 | O 11 | 2 | 280 |

TABLE 6

| | Components of hydrogen absorbing alloy (mole %) | | | | | | | | | | | | |
|---|---|---|---|---|---|---|---|---|---|---|---|---|---|
| | M1 | | | M2 | | | Co-existing quantity of M2 | M3 | | Co-existing quantity of M3 | M4 | | Co-existing quantity of M4 | Maximum discharge capacity (mAh/g) |
| | Mg | Ni | I1 | Mg | Ni | I2 | | Mg | I3 | | Ni | I4 | | |
| Example 33 | 55 | 40 | Al 5 | 31 | 65 | Pd 4 | 31 | 96 | Li 4 | 3 | — | — | — | 225 |
| Example 34 | 69 | 30 | Fe 1 | 45 | 55 | — | 17 | — | — | — | 98 | P 2 | 2 | 260 |
| Example 35 | 74 | 26 | — | — | — | — | — | 83 | Hf 7 | 10 | 96 | O 4 | 5 | 250 |
| Example 36 | 67 | 31 | W 2 | 31 | 60 | Y 9 | 3 | 85 | Sr 15 | 1 | 90 | Ge 10 | 0.3 | 215 |
| Example 37 | 60 | 35 | B 5 | 37 | 56 | Rh 7 | 25 | 99 | Ba 1 | 2 | — | — | — | 250 |
| Example 38 | 57 | 42 | Co 1 | 33 | 67 | — | 1 | — | — | — | 100 | — | 0.2 | 190 |
| Example 39 | 68 | 32 | — | — | — | — | — | 97 | Ca 3 | 21 | 99 | Ta 1 | 9 | 230 |
| Example 40 | 65 | 33 | C 2 | 32 | 60 | Pr 8 | 7 | 100 | — | 5 | 81 | N 19 | 4 | 260 |

As apparent from Tables 4 to 6, a battery with a negative electrode comprising a hydrogen-absorbing alloy which was constituted by not less than three regions, i.e. the aforementioned M1 region and at least two kinds of regions selected from M2, M3 and M4 as seen in Examples 21 to 40 indicated a very high discharge capacity and an excellent charge/discharge property as compared with the batteries of Comparative Examples 5 to 8.

As explained above, it is possible according to this invention to provide a hydrogen-absorbing alloy which is more improved in hydrogen-absorbing rate at the normal temperature or so, as compared with the conventional Mg—Ni-based hydrogen-absorbing alloy, while ensuring a high hydrogen absorption volume. Therefore, it is possible according to the hydrogen-absorbing alloy of this invention to further expand the field of application to which the conventional hydrogen-absorbing alloys have been applied, such for example as the storage and transport of hydrogen, the storage and transport of heat, the conversion of heat energy to mechanical energy, the separation and purification of hydrogen, the separation of hydrogen isotope, a battery employing hydrogen as an active material, a catalyst in synthetic chemistry, and a temperature sensor. Furthermore, it is also possible according to the hydrogen-absorbing alloy of this invention to further develop a new field of application utilizing a hydrogen-absorbing alloy.

Additionally, since both of the electrode and the alkaline secondary battery according to this invention make it possible to apply a magnesium-containing hydrogen-absorbing alloy to a charge/discharge reaction (that has been conventionally considered as being very difficult), an alkaline secondary battery of excellent property, e.g. light weight, low cost and excellent charge/discharge property, can be obtained. The electrode according to this invention can be employed as a electrode for electrolysis such as a negative electrode for electrolysis of brine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A hydrogen-absorbing alloy which comprises:
   a first region comprising 50 to 75 mole % of Mg, and not more than 50 mole % of Ni; and
   at least two regions selected from the group consisting of a second region comprising less than 50 mole % (including 0 mole %) of Mg and less than 75 mole % of Ni, a third region comprising not less than 75 mole % of Mg, and a fourth region comprising not less than 75 mole % of Ni.

2. The hydrogen-absorbing alloy according to claim 1, wherein said first region comprises 60 to 70 mole % of Mg, and 20 to 40 mole % of Ni.

3. The hydrogen-absorbing alloy according to claim 1, wherein said second region comprises 20 to 40 mole % of Mg, and 60 to 70 mole % of Ni.

4. The hydrogen-absorbing alloy according to claim 1, wherein said at least two regions are contained in said alloy at a ratio of 0.001 to 50 mole %.

5. The hydrogen-absorbing alloy according to claim 1, wherein one of said at least two regions is said second region.

6. The hydrogen-absorbing alloy according to claim 1, wherein said at least two regions are formed of said second region and said third region.

7. The hydrogen-absorbing alloy according to claim 6, wherein said second region is contained in said alloy at a ratio of 1 to 10 mole %.

8. The hydrogen-absorbing alloy according to claim 6, wherein said third region is contained in said alloy at a ratio of 1 to 10 mole %.

9. A electrode, which comprises a hydrogen-absorbing alloy comprising:
   a first region comprising 50 to 75 mole % of Mg and not more than 50 mole % of Ni; and
   at least two regions selected from the group consisting of a second region comprising less than 50 mole % (including 0 mole %) of Mg and less than 75 mole % of Ni, a third region comprising not less than 75 mole % of Mg, and a fourth region comprising not less than 75 mole % of Ni.

10. The electrode according to claim 9, wherein said first region comprises 60 to 70 mole % of Mg, and 20 to 40 mole % of Ni.

11. The electrode according to claim 9, wherein said second region comprises, 20 to 40 mole % of Mg, and 60 to 70 mole % of Ni.

12. The electrode according to claim 9, wherein said at least two regions are contained in said alloy at a ratio of 0.001 to 50 mole %.

13. The electrode according to claim 9, wherein one of said at least two regions is said second region.

14. The electrode according to claim 9, wherein said at least two regions are formed of said second region and said third region.

15. The electrode according to claim 14, wherein said second region is contained in said alloy at a ratio of 1 to 10 mole %.

16. The electrode according to claim 14, wherein said third region is contained in said alloy at a ratio of 1 to 10 mole %.

17. An alkaline secondary battery with a negative electrode comprising a hydrogen-absorbing alloy which comprises:
   a first region comprising 50 to 75 mole % of Mg and not more than 50 mole % of Ni; and
   at least two regions selected from the group consisting of a second region comprising less than 50 mole % (including 0 mole %) of Mg and less than 75 mole % of Ni, a third region comprising not less than 75 mole % of Mg, and a fourth region comprising not less than 75 mole % of Ni.

18. The secondary battery according to claim 17, wherein said first region comprises 60 to 70 mole % of Mg, and 20 to 40 mole % of Ni.

19. The secondary battery according to claim 17, wherein said second region comprises 20 to 40 mole % of Mg, and 60 to 70 mole % of Ni.

20. The secondary battery according to claim 17, wherein said at least two regions are contained in said alloy at a ratio of 0.001 to 50 mole %.

21. The secondary battery according to claim 17, wherein one of said at least two regions is said second region.

22. The secondary battery according to claim 17, wherein said at least two regions are formed of said second region and said third region.

23. The secondary battery according to claim 22, wherein said second region is contained in said alloy at a ratio of 1 to 10 mole %.

24. The secondary battery according to claim 22, wherein said third region is contained in said alloy at a ratio of 1 to 10 mole %.

25. The hydrogen-absorbing alloy according to claim 1, wherein the hydrogen-absorbing alloy consists essentially of Mg and Ni, and consists of:
- a first region comprising 50 to 75 mole % of Mg; and
- at least two regions selected from the group consisting of a second region comprising 25 to 50 mole % of Mg, a third region comprising 75 to 100 mole % of Mg, and a fourth region comprising 0 to 25 mole % of Mg.

26. The hydrogen-absorbing alloy according to claim 1, wherein the alloy comprises:
- a first region comprising 50 to 75 mole % of Mg, and not more than 50 mole % of Ni; and
- at least two regions selected from the group consisting of a second region comprising less than 50 mole % (including 0 mole %) of Mg and 50 to 75 mole % of Ni, a third region comprising not less than 75 mole % of Mg, and a fourth region comprising not less than 75 mole % of Ni.

27. The hydrogen-absorbing alloy according to claim 1, wherein at least one of the regions is a non-equilibrium phase.

28. The electrode according to claim 9, wherein at least one of the regions is a non-equilibrium phase.

29. The alkaline secondary battery according to claim 17, wherein at least one of the regions is a non-equilibrium phase.

* * * * *